United States Patent [19]

Japenga

[11] 3,821,483

[45] June 28, 1974

[54] TELEPHONE LINE LOOP EXTENDER

[75] Inventor: Ronald Japenga, Glendale Heights, Ill.

[73] Assignee: Reliable Electric Company, Franklin Park, Ill.

[22] Filed: Oct. 17, 1972

[21] Appl. No.: 298,337

[52] U.S. Cl. .......................... 179/16 F, 179/170 R

[51] Int. Cl. .......................... H04m 3/40

[58] Field of Search .......................... 179/170 R, 16 F

[56] References Cited

UNITED STATES PATENTS

| | | | |
|---|---|---|---|
| 3,531,598 | 9/1970 | McNair | 179/16 F |
| 3,639,696 | 2/1972 | Chambers | 179/16 F |

*Primary Examiner*—Kathleen H. Claffy

*Assistant Examiner*—Gerald L. Brigance

*Attorney, Agent, or Firm*—Olson, Trexler, Wolters, Bushnell & Fosse, Ltd.

[57] ABSTRACT

A telephone extender is disclosed herein which includes a pair of bidirectional current flow control circuit paths for connection into each of the pair of lines of a telephone line loop. Each of the bidirectional current flow control circuit paths includes a pair of cross couples switching transistors for providing one current path and a single transistor in series with an external power source providing the other current path. Only a single power source is connected in one or the other of the telephone lines. A high impedance cross coupling is connected between the pair of bidirectional current flow control circuit paths so that proper polarity conduction occurs in each circuit.

5 Claims, 3 Drawing Figures

TELEPHONE LINE LOOP EXTENDER

BACKGROUND OF THE INVENTION

This invention relates generally to telephone transmission equipment and, more particularly, to telephone line loop extenders used for increasing the transmission range of telephone lines.

The effective transmission range of telephone lines is limited by the amount of signal attenuation which occurs over the lines due to the internal resistance of the line. This internal resistance is inversely proportional to the cross section of the area and directly proportional to the length of the transmission lines. Therefore, extended transmission lines such as long distance lines have substantial amounts of internal resistance and thus reduce the signal strength being transmitted thereacross. To eliminate effects of the inherent internal resistance of the transmission lines, telephone line extenders have been provided. Such loop extenders are sometimes commonly referred to as voltage booster circuits.

The circuit arrangement of the telephone line loop extenders provided heretofore have incorporated many electronic components in their circuitry. The increased number of electronic components causes the reliability of such circuits to be somewhat reduced and in some cases marginal. Also, because of the substantial number of components, the telephone line of the extenders are relatively expensive.

Accordingly, it is an object of this invention to provide a new and improved telephone line loop extender circuit which incorporates a minimum of electronic components, and is thereby more reliable in operation.

Another object of this invention is to provide an improved telephone line loop extender which is efficient in operation and less expensive to manufacture.

Many other objects, features and advantages of this invention will become more fully realized and understood from the following detailed description when taken in conjunction with the accompanying drawings wherein like reference numerals throughout the various views of the drawings are intended to designate the similar elements or components.

DETAILED DESCRIPTION OF THE ILLUSTRATED EMBODIMENTS

Figure 1:
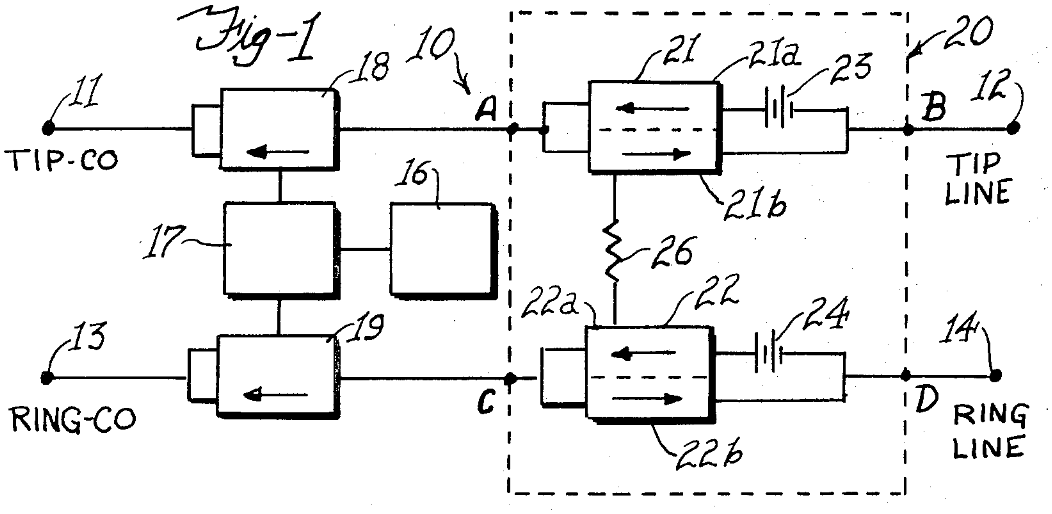
FIG. 1 is a simplified block diagram of a typical telephone line loop extender wherein the improved circuitry of this invention is incorporated within the broken line area.

Referring now to FIG. 1, the telephone line loop extender is designated generally by reference numeral 10 and includes a pair of input and output terminals 11 and 12, respectively, to be connected to the tip line of the telephone line loop. Also, a pair of terminals 13 and 14 are arranged for connection to the ring line of the telephone line loop. Terminals 11 and 13 are designated "CO" thus indicating that these terminals are to be connected to the central office connection, and terminals 12 and 14 are designated "line" to indicate that these terminals are to be connected to the subscribers line. Operating a power for the telephone line loop extender 10 is obtained from an inverter circuit designated by reference numeral 16 which, in turn, is operatively controlled by means of an inverter switch and turn-off delay circuit 17. The polarity of the voltage applied to the central office terminals 11 and 13 determines the direction of current flow through a pair of current sensing circuits 18 and 19 connected to the lines.

A pair of bidirectional current flow control circuit paths 21 and 22 are associated with the control circuit 20 shown inside the broken line area. The bidirectional current flow control paths are indicated by reference numerals 21*a* and 21*b* and 22*a* and 22*b*. A single external power source 23 is connected to the control circuit 21, and a single external power source 24 is connected to the control circuit 22. Upon energization of the bidirectional current flow control circuits only one of the external power sources 23 or 24 is inserted into the telephone line loop. For example, should the current control circuit 21*a* be conductive to insert the external power source 23 into the line between terminals 11 and 12, the control circuit 22*b* would be rendered conductive to provide a switchable current flow path from ring terminal 13 to ring terminal 14, this being only a current path without insertion of the battery 24. Reversal of polarity of the tip and ring lines will cause a reverse condition of the control circuits to occur thus inserting only the battery 24 while maintaining the battery 23 out of the circuit.

To insure proper steering of the direction of current flow through the electronic components forming the bidirectional control circuits 21 and 22, a cross coupling high impedance network is provided, this network being designated by the resistance element 26. Typically the value of the resistor 26 may be in the order of about 2.2 megohms.

Figure 2:
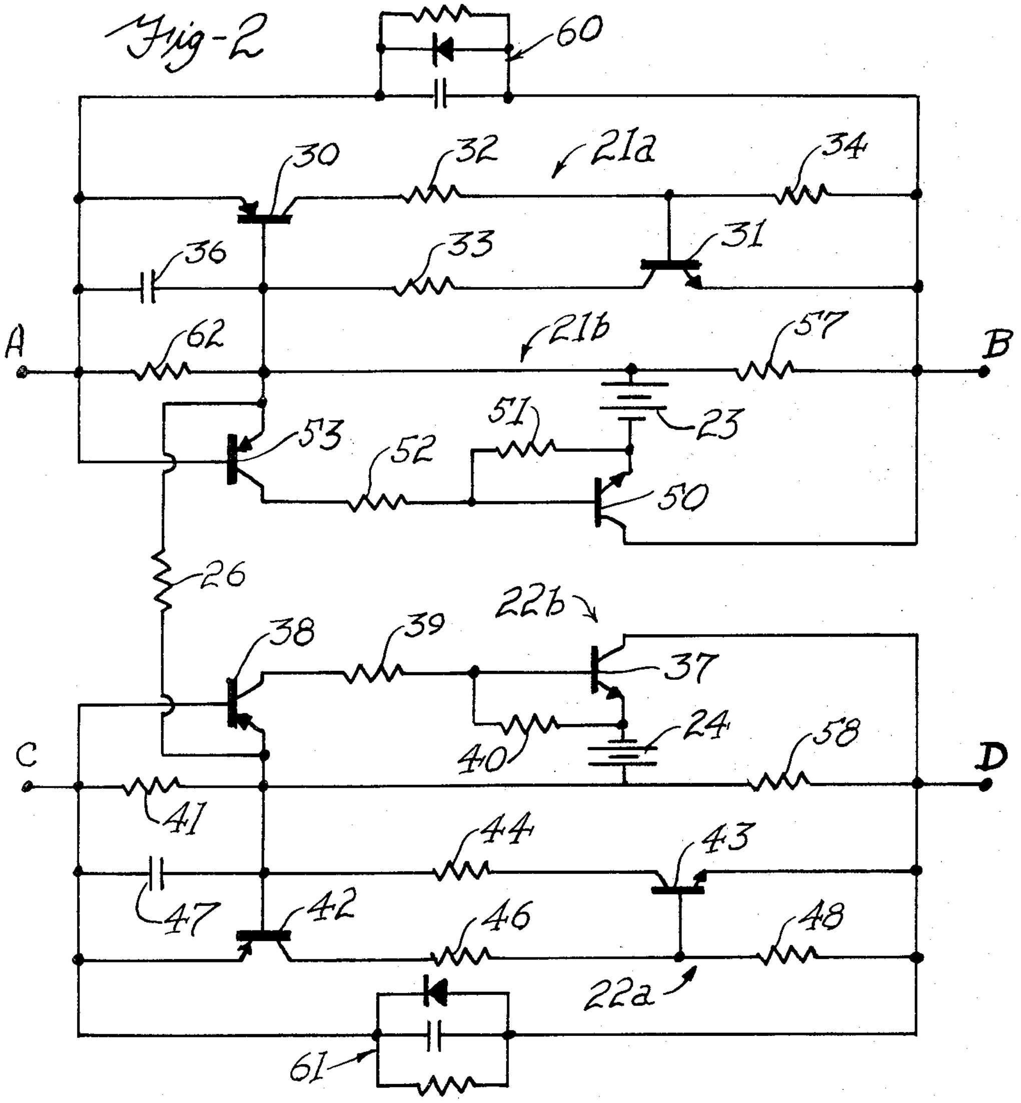
FIG. 2 is a detailed schematic showing of one form of the telephone line loop extender of this invention.

For a better understanding of the specific circuit construction of the control circuit of this invention, reference is now made to FIG. 2. Here the corresponding terminals of the control circuit are designated by reference letters A, B, C, and D. The current control circuit 21*a* is formed by a pair of cross coupled transistors 30 and 31 having the emitter-collector junctions thereof cross coupled through corresponding resistors 32 and 33 to the base electrode of the other transistor. Biasing voltage is applied to transistor 31 by means of a base resistor 34, and a coupling capacitor 36 is connected to the base electrode of the transistor 30. The cross coupled transistors 30 and 31 are operated in a switching mode to provide a low impedance current path from terminal A to terminal B. The telephone connection is made between terminals B and D by operation of the telephone receiver, this being accomplished, for example, by raising the telephone off its hook. The return path for current flow from terminal B to terminal C is accomplished by inserting the external power source 24, shown as a battery, into series relation with the circuit. This is accomplished by rendering a transistor 37 conductive. The transistor 37 preferably is a power transistor which has the base electrode thereof coupled to a more sensitive control transistor 38 through a resistor 39. The base emitter junction of transistor 37 is biased through a resistor 40. Similarly, the base emitter junction of transistor 38 is biased through a resistor 41.

Therefore, when terminal A is positive with respect to terminal C, the current path through the control circuit 21 is through the cross coupled transistors 30 and 31 to the telephone line and then through terminals B to C by means of the transistor 37 and the external power source 24 in series therewith. Thus, the external power source 24 adds its voltage value to the line for increasing the effective range of the line.

When the polarity of terminals A and C is reversed, terminal C now being the positive terminal, a pair of cross coupled transistors 42 and 43 are rendered conductive as a result of the cross coupling between their respective resistors 44 and 46. The transistor 42 has the base emitter junction thereof connected through a capacitor 47 while transistor 43 has the base emitter junction thereof biased through a resistor 48. Current now flows from terminal C to terminal D through the cross coupled transistors 42 and 43, through the telephone apparatus at the end of the line, and then from terminal B to terminal A through a single transistor 50 connected in series with the external power source 23. The transistor 50 has the base emitter electrode thereof biased by means of a resistor 51 which in turn is connected to a series resistance 52 at the collector electrode of a control transistor 53. The transistor 53 is rendered conductive upon application of a positive voltage to the emitter electrode thereof via the cross coupling high impedance element 26. This action will then render the transistor 50 conductive to insert the external power source 23. Connected in series with the external power sources 23 and 24 are resistors 57 and 58, respectively. During initial operation of the control circuit of FIG. 2, when the receiver is first picked up from its hook, initial current flows through a pair of bypass networks 60 and 61 shunting the bidirectional current flow control circuits. Each of the bypass networks is formed of parallel connected components such as a capacitor, a diode and a resistor.

In operation, the transistors 30 and 31, as well as transistors 42 and 43, function as a switching circuit having a rapid switching time comparable to a silicon controlled switch. Transistors 37 and 38, together with transistors 50 and 53, form a high sensitive applifier-type switching transistor where the single transistor, either 37 or 50, is connected in series with the external power source and the other transistor is merely a control device. If we assume an initial condition such that the tip line at the central office is positive, this being terminal A of FIG. 2, initial current flow into the line will apply biasing current through a resistor 62, the series connected across couple resistor 26 and the resistor 41. This action will forward bias transistor 30 to a conductive state while transistors 50 and 52 are reverse bias and held in a non-conductive state. Also, the initial bias condition is applied to transistors 37 and 38 to render them conductive and insert the external power source 24 into the circuit.

When the circuit is completed from terminals B to D, typically by lifting the phone from the hook switch, current will flow in the telephone line loop. This current will flow initially through the capacitor of the bypass network 60. The initial current flow through the capacitor will maintain a voltage drop of substantially zero volts between terminals A and B. As the capacitor starts to charge, current will start to flow through resistors 62 and 57 to aid the bias current on transistor 30 to render it more conductive. This initial current flow has the same effect as supplying an anode gate control circuit to a silicon controlled rectifier switching device. As the charge on the capacitor of the bypass network 60 increases, the current through resistors 62 and 57 also increases to render transistor 30 more conductive, substantially to a saturated state. This results in an increase in the collector current of transistor 30 which tends to forward bias the transistor 31. When the voltage drop from terminals A to B reaches about 2 volts, there is sufficient gate drive to render the transistors 30 and 31 to a substantially saturated state, thus being operated as a switch. When transistors 30 and 31 are switched to a saturated condition, charge on the capacitor of the bypass network 60 is removed and the voltage between terminals A and B will be clamped to the voltage value of the voltage drop across the respective transistors. Cross coupling resistors 32 and 33 limit the peak discharge current of the capacitor within the bypass network 60. It will be noted that the switching action of transistors 30 and 31 occurs as a function of the bias current and the direction of the loop current in the telephone lines and not as a function of the external voltage source connected to the circuit.

The switching of the current flow path between terminals D and C is accomplished by initial current passing through the diode of the bypass circuit 61. The external voltage sources 23 and 24 preferably are electronic sources produced by the inverter circuit 16, FIG. 1, and are inserted into the circuit upon sensing the proper voltage condition on the ring line between terminals 13 and 14. Current flow between resistors 41 and 48 serve to forebias the transistor 38 which, in turn, renders transistor 37 conductive. The conduction of transistors 37 inserts the voltage source 24 in series with the terminals D and C.

In order to prevent distortion in the dial pulses during operation of the phone system it is necessary to hold the boost voltage on during the break period. Therefore, the resistor in the bypass network 61 provides the additional drive bias to hold transistor 38 in a conductive state. During this time the capacitor of the bypass network 61 is charged to almost the supply voltage of the source 24. Therefore, when the loop opens from B to D, as a result of the dial pulses, the transistors 38 and 37 will remain in their saturated state. This then insures that only the proper transistors are rendered conductive to provide a single current path at a time to each half of the circuit.

When the polarity at terminals 11 and 12, FIG. 1, reverses, for example, as the result of answer supervision, the current reversal will cause transistors 42 and 43 to be rendered conductive while transistors 30 and 31 are maintained in a non-conductive state. Also, upon reversal of the applied voltage, transistors 50 and 53 are conductive while transistors 37 and 38 are non-conductive.

Figure 3:
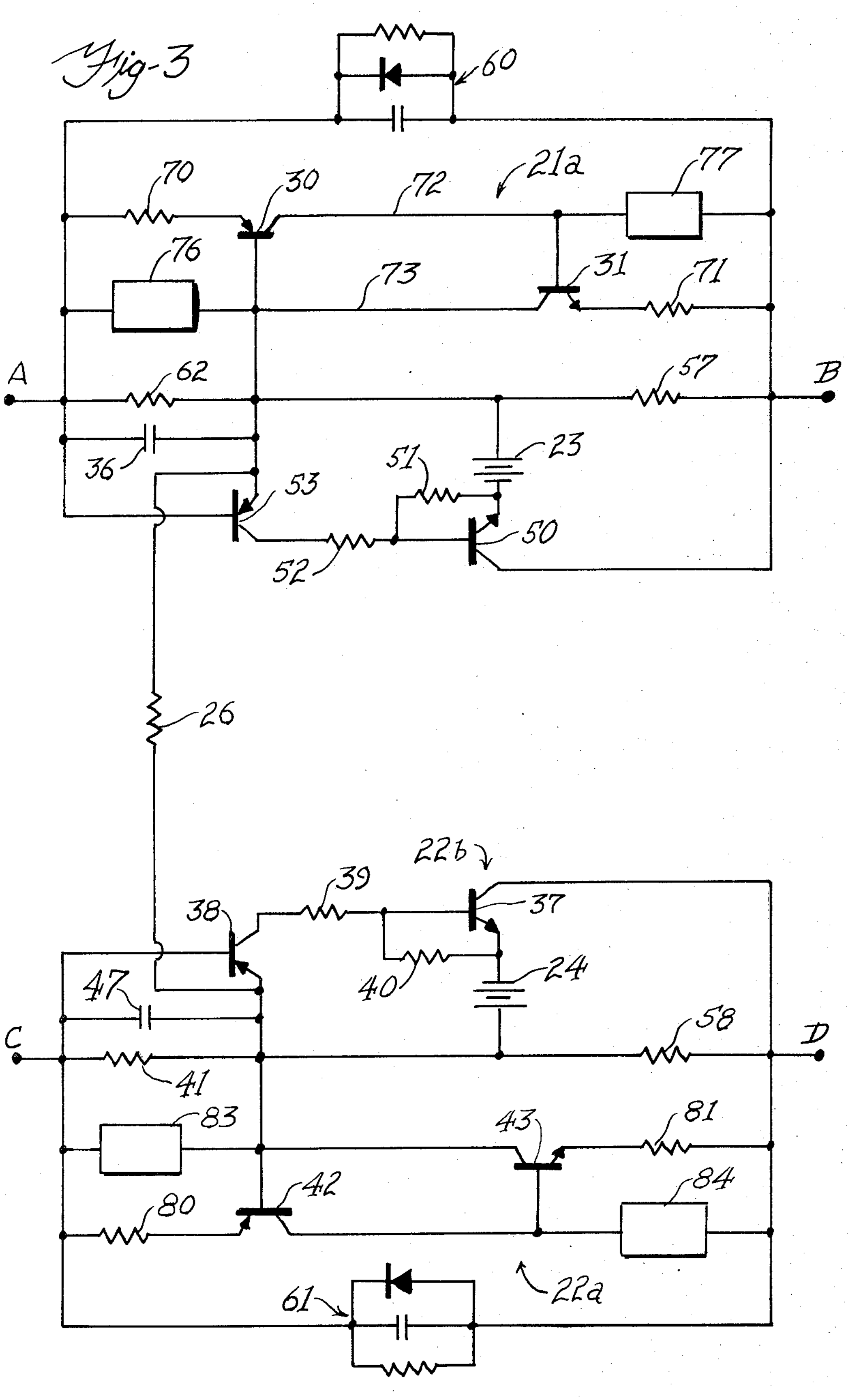
FIG. 3 is an alternate form of the telephone line loop extender circuit of FIG. 2.

Referring now to FIG. 3, there is seen a modified circuit arrangement of the circuit shown in FIG. 2, it being noted that similar components between the two figures have the same reference numeral. The circuit arrangement of FIG. 3 has a series connected resistor 70 connected to the emitter electrode of the transistor 30 and resistor 71 connected to the emitter electrode of the transistor 31. It will be noted that the cross coupling between the two transistors are through lines 72 and 73 which are free of resistance elements. Also, the base emitter junction of transistors 30 and 31 are provided with reference voltage sources 76 and 77, respectively.

In like manner, the transistors 42 and 43 have resistors 80 and 81 connected to the emitter electrodes thereof, and no resistors are connected between the base collector electrodes. A reference voltage source 83 is connected to the base electrode of transistor 42 and a second reference voltage source 84 is connected to the base electrode of the transistor 43.

The circuit operation of FIG. 3 is substantially the same as that of the circuit of FIG. 2 except that the current limiting action occurs between the cross coupled transistors 30 and 31 and the cross coupled transistors 42 and 43. The reference voltage sources 76, 77, 83, and 84 can be supplied by any suitable means such as reference diodes, zener diodes, batter sources, etc. By holding the base voltage of transistors 30, 31, 42, and 43 at a constant reference value the maximum current flow through the circuit can be controlled by the value of the emitter resistor connected in the series therewith. This is true, since the base emitter voltage of the transistors is held at approximately 0.6 volts, this being a standard reference voltage for silicon type transistors. If we assume that the reference voltage of the source 77 is held at 2 volts then we need only 1.4 volts across the resistor 71 as the remaining point of 0.6 volts is established across the base emitter junction of the transistor 31. It is then possible to limit the current through the circuit to approximately 14MA and then resistor 71 would be in the order of 100 OHMS. If the current through transistor 31 tries to exceed the 14MA value due to an external current charge, this would attempt to increase the emitter voltage. However, this would tend to cut off the transistors since it is only necessary to have a voltage at the base emitter junction of 0.6 volts and the base is held at the 2 volt value. This then holds the maximum current through the circuit at 14MA, and the dynamic impedance of the transistor changes in order to limit the current to that value.

While two specific embodiments of the present invention have been illustrated herein, it will be understood that other suitable variations and modifications may be effected without departing from the spirit and scope of the novel concepts disclosed and claimed herein.

The invention is claimed as follows:

1. A telephone line loop extender comprising: first and second bidirectional current flow control paths, said first and second bidirectional current flow control paths being arranged for connection in series with respective first and second lines of a telephone line loop, each of said first and second bidirectional current flow control paths include a pair of cross coupled transistors forming one of the current flow control paths thereof, said cross coupled transistors having the collector-emitter current path thereof connected to the base of the other of said transistors for biasing the same to a conductive condition upon increased current flow of said one of said transistors, polarity sensing means associated with each of said bidirectional current flow control paths for sensing a voltage polarity at a central office and thereby causing a current flow in one direction through said first bidirectional current flow control path and in the opposite direction in said second bidirectional current flow control path, a single polarity voltage source associated with each of said first and second bidirectional current flow control paths, only one of said voltage sources at a given time being inserted into the telephone line loop by proper directional switching of said first and second bidirectional current flow control paths, and a high impedance current coupling between said first and second bidirectional current flow control paths for rendering operative a current flow path means in one of the said first and second bidirectional current flow control paths and for switchably inserting said single polarity voltage source in the other of said first and second bidirectional current flow control paths, whereby current is added to the telephone line loop by being inserted into one of the pair of telephone lines.

2. The telephone line loop extender according to claim 1, wherein reference voltage means is connected to the base emitter junction of each of said pair of transistors.

3. The telephone line loop extender according to claim 1, wherein said high impedance current coupling is formed of a resistor.

4. A telephone line loop extender comprising: first and second bidirectional current flow control paths, said first and second bidirectional current flow control paths being arranged for connection in series with respective first and second lines of a telephone line loop, polarity sensing means associated with each of said bidirectional current flow control paths for sensing a voltage polarity at a central office and thereby causing a current flow in one direction through said first bidirectional current flow control path and in the opposite direction in said second bidirectional current flow control path, a single polarity voltage source associated with each of said first and second bidirectional current flow control paths, only one of said voltage sources at a given time being inserted into the telephone line loop by proper directional switching of said first and second bidirectional current flow control paths, a high impedance current coupling between said first and second bidirectional current flow control paths for rendering operative a current flow path means in one of the said first and second bidirectional current flow control paths and for switchably inserting said single polarity voltage source in the other of said first and second bidirectional current flow control paths, whereby current is added to the telephone line loop by being inserted into one of the pair of telephone lines, and including a bypass network shunting each of said first and second bidirectional current flow control paths, said bypass circuit being formed of parallel connected capacitor, diode and resistor components.

5. A telephone line loop extender comprising: first and second bidirectional current flow control paths, said first and second bidirectional current flow control paths being arranged for connection in series with respective first and second lines of a telephone line loop, said first and second bidirectional current flow control paths each include a pair of cross coupled transistors forming one of the current flow control paths thereof, one of said transistors having the emitter-collector current path thereof connected to the base of the other transistor for biasing the same to a conductive condition, a semiconductor switching device connected in series with said single polarity voltage source and forming the other current flow control path in opposite conductive polarity of said pair of transistors, said semiconductor switch inserting the said voltage source into the circuit when said pair of transistors are maintained in a non-conductive state, polarity sensing means associated with each of said bidirectional current flow control paths for sensing a voltage polarity at a central office and thereby causing a current flow in one direction through said first bidirectional current flow control path and in the opposite direction in said second bidirectional current flow control path, a single polarity voltage source associated with each of said first and second bidirectional current flow control paths, only one of said voltage sources at a given time being inserted into the telephone line loop by proper directional switching of said first and second bidirectional current flow control paths, and a high impedance current coupling between said first and second bidirectional current flow control paths for rendering operative a current flow path means in one of the said first and second bidirectional current flow control paths and for switchably inserting said single polarity voltage source in the other of said first and second bidirectional current flow control paths, whereby current is added to the telephone line loop by being inserted into one of the pair of telephone lines.

* * * * *